(12) United States Patent
Wilton

(10) Patent No.: US 11,514,184 B1
(45) Date of Patent: Nov. 29, 2022

(54) DATABASE QUERY INFORMATION PROTECTION USING SKELETONS

(71) Applicant: Amazon Technologies, Inc., Seattle, WA (US)

(72) Inventor: Jeremiah C. Wilton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 940 days.

(21) Appl. No.: 16/291,331

(22) Filed: Mar. 4, 2019

(51) Int. Cl.
*G06F 21/62* (2013.01)
*G06F 16/901* (2019.01)
*G06F 16/903* (2019.01)
*G06F 9/54* (2006.01)
*G06F 16/9032* (2019.01)

(52) U.S. Cl.
CPC .......... *G06F 21/6227* (2013.01); *G06F 9/542* (2013.01); *G06F 16/9017* (2019.01); *G06F 16/9032* (2019.01); *G06F 16/90335* (2019.01); *G06F 21/6254* (2013.01)

(58) Field of Classification Search
CPC ............. G06F 21/6227; G06F 16/9032; G06F 16/90335; G06F 16/9017; G06F 9/542; G06F 21/6254
See application file for complete search history.

(56) References Cited

U.S. PATENT DOCUMENTS

| | | | | |
|---|---|---|---|---|
| 5,875,334 A | * | 2/1999 | Chow | G06F 8/433 717/139 |
| 7,680,759 B1 | * | 3/2010 | Coley | G06F 16/24 707/999.001 |
| 2011/0129089 A1 | * | 6/2011 | Kim | G06F 21/6227 715/236 |
| 2018/0248848 A1 | * | 8/2018 | Wu | G06F 21/6227 |

* cited by examiner

*Primary Examiner* — Saleh Najjar
*Assistant Examiner* — Devin E Almeida
(74) *Attorney, Agent, or Firm* — Nicholson De Vos Webster & Elliott, LLP

(57) ABSTRACT

Techniques for database query information protection using skeletons are described. An agent installed on a host computing device with a database instance obtains queries executed by the database instance and skeletonizes the queries to remove sensitive data from them. The agent identifies references within the queries, obtains structural definitions for the references, and inserts placeholders into the queries in place of the references and relates the placeholders to the definitions. The query skeletons and/or similarly-constructed execution plan skeletons may be analyzed to identify modifications to queries and/or the database instance to improve query processing.

20 Claims, 11 Drawing Sheets

EXECUTION PLAN 505

| ID | OPERATION | NAME | ROWS | BYTES | COST (%CPU) | TIME |
|---|---|---|---|---|---|---|
| 0 | SELECT STATEMENT | | | | 4 (0) | 00:00:01 |
| 1 | NESTED LOOPS | | 1 | 58 | | |
| 2 | NESTED LOOPS | | 1 | 58 | 4 (0) | 00:00:01 |
| * 3 | TABLE ACCESS FULL | EMP | 1 | 38 | 3 (0) | 00:00:01 |
| * 4 | INDEX UNIQUE SCAN | PK_DEPT | 1 | | 0 (0) | 00:00:01 |
| 5 | TABLE ACCESS BY INDEX ROWID | DEPT | 1 | 20 | 1 (0) | 00:00:01 |

PREDICATE INFORMATION (IDENTIFIED BY OPERATION ID):

3 - FILTER("E"."ENAME"='SMITH')
4 - ACCESS("E"."DEPTNO"="D"."DEPTNO")

(PARTIAL) EXECUTION PLAN SKELETON 510

| ID | OPERATION | NAME | ROWS | BYTES | COST (%CPU) | TIME |
|---|---|---|---|---|---|---|
| 0 | SELECT STATEMENT | | | | 4 (0) | 00:00:01 |
| 1 | NESTED LOOPS | | 1 | 58 | | |
| 2 | NESTED LOOPS | | 1 | 58 | 4 (0) | 00:00:01 |
| * 3 | TABLE ACCESS FULL | &001 | 1 | 38 | 3 (0) | 00:00:01 |
| * 4 | INDEX UNIQUE SCAN | &002 | 1 | | 0 (0) | 00:00:01 |
| 5 | TABLE ACCESS BY INDEX ROWID | &003 | 1 | 20 | 1 (0) | 00:00:01 |

PREDICATE INFORMATION (IDENTIFIED BY OPERATION ID):

3 - FILTER(&001.&004=&005)
4 - ACCESS(&001.&006=&003.&007)

*FIG. 5*

DATABASE QUERY INFORMATION PROTECTION USING SKELETONS

BACKGROUND

Many companies and other organizations operate computer networks that interconnect numerous computing systems to support their operations, such as where computing systems are co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Many public data center operators, such as service providers who operate service provider networks, offer their customers a variety of resources as services. For example, one popular set of services involve databases, where customers may utilize various types of databases such as relational databases often used by for transactional applications, non-relational databases for internet-scale applications, data warehouses for analytics, in-memory data stores for caching and/or real-time workloads, graph databases for building applications with highly-connected data, time series databases for measuring changes over time, ledger databases to maintain a complete and verifiable record of transactions, etc.

The type of information stored or queried using such "cloud" databases is often sensitive, such as personally-identifiable information (PII) that can be used on its own or with other information to identify, contact, or locate a single person, or to identify an individual in context, etc. Accordingly, customers of provider networks often require that their data and queries (which may include or otherwise identify sensitive information) are protected at all times—e.g., when in transit, when stored—so that it others are unable to access this information. As a result, cloud providers may encrypt both the queries and data in such a manner (e.g., using customer encryption keys) so that even the cloud provider network is unable to access this information. As a result, the information remains secure from third parties, and the provider network itself is unable to have any visibility into the particular types of queries that are being executed by its customers.

BRIEF DESCRIPTION OF DRAWINGS

Various embodiments in accordance with the present disclosure will be described with reference to the drawings, in which:

FIG. 5 is an example of an execution plan and a partial execution plan skeleton according to some embodiments.

DETAILED DESCRIPTION

Various embodiments of methods, apparatus, systems, and non-transitory computer-readable storage media for database query information protection using skeletons are described. According to some embodiments, a database service can create database query and/or execution plan skeletons that retain the organizational and structural aspects of these entities while removing any potentially-sensitive data. The skeletons may then beneficially be analyzed individually and/or collectively to identify optimizations for the queries or execution plans and/or changes to the configurations of the involved databases to improve the performance of the databases for involved users as well as other users of the database service through improved system-wide performance.

Figure 1:
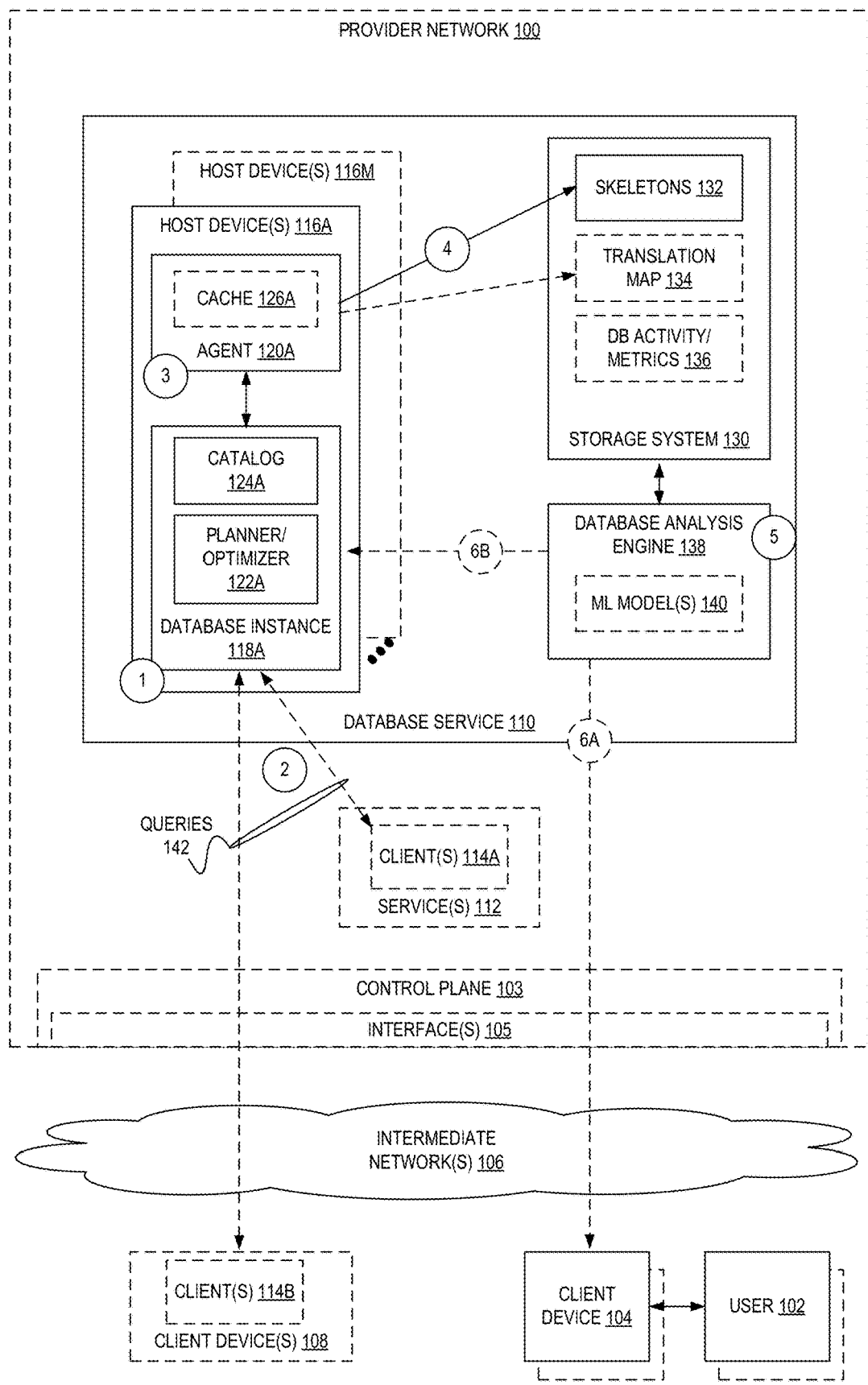
FIG. 1 is a diagram illustrating an environment for database query information protection using skeletons according to some embodiments.

FIG. 1 is a diagram illustrating an environment for database query information protection using skeletons according to some embodiments. FIG. 1 includes a database service 110 that generates and utilizes skeletons to provide information security to users of the database service while enabling the database service (or other entities) to analyze information about the types of queries being executed, allowing for beneficial query optimizations and/or database configuration changes to be identified and implemented. The database service 110 may be implemented as one or more software modules executed by one or more computing devices of a provider network 100.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, a database service that can run queries involving data and/or store data, etc. The users 102 (or "customers") of provider networks 100 may utilize one or more user accounts that are associated with a customer account, though these terms may be used somewhat interchangeably depending upon the context of use. Users 102 may interact with a provider network 100 via a client device 104 across one or more intermediate networks 106 (e.g., the internet) via one or more interface(s) 105, such as through use of application programming interface (API) calls, via a console implemented as a website or application, etc. The interface(s) 105 may be part of, or serve as a front-end to, a control plane 103 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code (e.g., a query) to be executed by the provider network, which in turn utilizes a compute instance to execute the code (typically without the user having any control of or knowledge of the underlying compute instance(s) involved).

The database service 110 may be a managed service that makes it easy for users to set up, operate, and scale databases in a provider network 100 in the form of database instances 118A-118M. For example, the database service 110 may provide resizable capacity while managing time-consuming database administration tasks. The database service 110 may provide one or more of a variety of database engines (e.g., relational database engines such as MySQL, MariaDB, Oracle™, SQL Server, PostgreSQL, etc., and/or non-relational database engines) allowing existing code, applications, and/or tools to work seamlessly with databases provided by the database service 110. In some embodiments, the database service 110 may perform administrative tasks such as provisioning the infrastructure capacity for databases, configuring the databases, automatically backing up databases, upgrading and/or patching database software, scaling the compute resources or storage capacity associated with its database instances, etc.

As shown by circle (1), a user 102 of the provider network 100 may interact with the database service 110 (not shown) to implement one or more database instances 116A-116M, which may include the user 102 utilizing a console of a web-based application to issue one or more requests to an endpoint associated with the database service 110 indicating the user's 102 desire to launch/configure one or more database instances 116A-116M. A management engine or controller (not illustrated) of the database service 110 may then, in response, perform operations to obtain compute resources (e.g., VMs executed by host device(s) 116A-116M or VM reserved "slots" of the host device(s) 116A-116M) for the database(s) 118A-118M within the provider network 100, launch VM images (optionally having code for the database pre-installed, optionally launch or install databases on the host device(s) 116A-116M, configure the database instance(s) 118A-118M, configure security rules and/or permissions used by the database instance(s) 118A-118M or used for accessing the database instance(s) 118A-118M, etc. In some embodiments, a user 102 may then be provided resource identifiers for the database instance(s) 118A-118M (or other access mechanisms for the database instances), allowing the user 102 to configure the database instance(s) 118A-118M, populate data in the database instance(s) 118A-118M by inserting records or restoring a backup or importing a recordset, etc.

Thereafter, clients (e.g., one or more clients 114B implemented by client device(s) 108 outside the provider network 100, and/or clients 114A implemented within the provider network, such as by a service 112 such as a hardware virtualization service or serverless execution service) may send queries 142 at circle (2) to be executed by the database instance(s) 118A-118M. In some embodiments, the queries 142 may be sent using HyperText Transfer Protocol (HTTP) messages to endpoint(s) associated with the database instance(s) 118A-118M.

In some embodiments, the queries 142 are sent in an encrypted format. In some embodiments, within the context of the provider network 100 (at least) only the recipient database instance (e.g., database instance 118A) may be able to decrypt the queries 142, for example, by only giving the recipient database instance access to a key associated with the user 102 that can be used for decryption. Similarly, in some embodiments the database instance(s) 118A-118M similarly store all underlying data in an encrypted form so that only the database instance(s) 118A-118M (at least with regard to the provider network 100) can access the data. Such a configuration supports a privacy mechanism where the queries are all encrypted in transit and at rest within the provider network 100, while only the involved database instance(s) 118A-118M are able to access the query or database data in non-encrypted form (e.g., plaintext).

As indicated above, such configurations provide security at the expense of visibility from the database service's 110 perspective in that it has no insight into the particular queries 142 being issued to the database instance(s) 118A-118M. This lack of visibility, which provides security for users of the service, prevents the database service 110 from being able to analyze the queries with reference to the database instance configurations to be able to identify ways that the queries and/or database configurations could be changed to improve performance for the users 102.

However, embodiments disclosed herein can provide the database service 110 insight into the types of queries 142 being executed without accessing any sensitive data within the queries 142 such as table names, column names, data values (e.g., an employee name, a credit card number, an address, a government-issued indenting number), etc., via use of skeletons.

For example, the database service 110 may implement one or more agents 120A-120M on the host device(s) 116A-116M. The agent(s) 120A-120M may each be a software module that is executed by a host device that can interact with a database instance (e.g., a database instance 118A that operates on the same host device 116A as the agent 120A), e.g., via issuing its own queries, accessing underlying database logs and/or configuration data structures, etc. As one example, an agent 120A may periodically (or according to a schedule, or responsive to some sort of event) issue a request to the database instance 118A for details of currently-executing queries, which may include the queries themselves in plaintext form.

As another example, an agent 120A may send a request periodically (e.g., every second, every five seconds, etc.) to identify which queries are currently being executed by the database instance, providing the agent 120A with visibility into the most popular queries (that are running a lot) and/or "heaviest" queries (that take a long time to run). Both types of these queries are important to be analyzed, as other types of queries (e.g., "one-off" queries) are by their very nature random and difficult to optimize for, and further tend to have little to no long-term improvement resulting by optimizing the database for them. An agent 120A may also or alternatively obtain information about other types of queries, such as those that are the most frequently run over a period of time, those that are responsible for the most amounts of reads or writes to database data, etc.

For each obtained query (or a subset thereof, such as a "top" number of these queries), the agent 120A may "skeletonize" the query at circle (3) to effectively strip the sensitive subject matter of the query away in a manner that preserves the structure of the query and provides sufficient details regarding the type of data in the query (though not the actual data), the type/structure of any underlying data being queried against within the database, the details of any indices (also referred to as "indexes") implemented for the data that may exist, etc.

Figure 2:
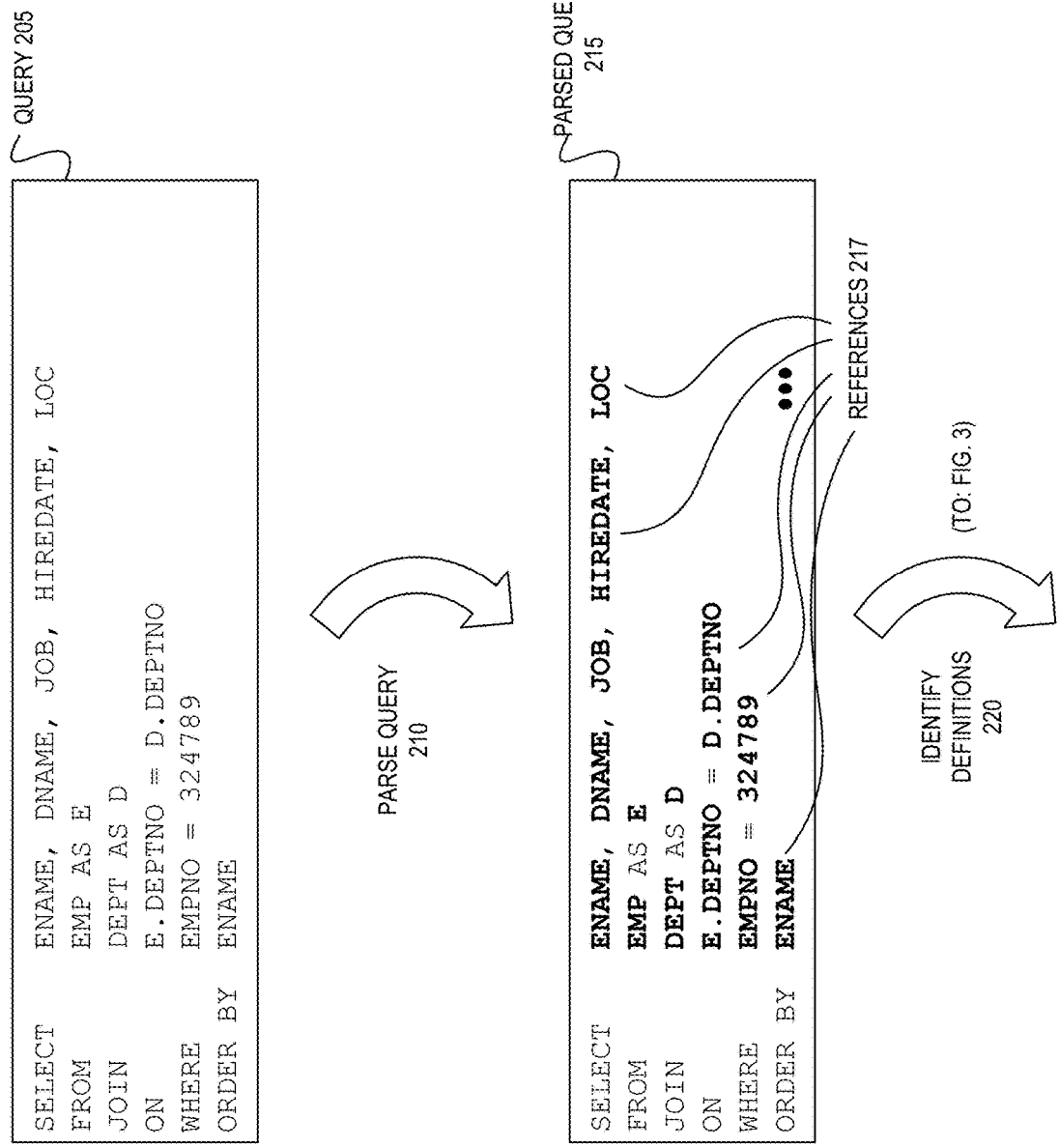
FIG. 2 is an example of a database query and parsed database query including identified references according to some embodiments.

For example, FIG. 2 is an example of a database query 205 and parsed database query 215 including identified references according to some embodiments. In this example, the database query 205 is a SQL-type query (e.g., that adheres to a particular SQL standard, or some standard supported by the database instance) that is a SELECT query seeking to select particular data from a database. Thus, the query 205 includes various keywords such as SELECT, FROM, JOIN, ON, WHERE, ORDER BY, etc., that describe the query but do not include sensitive user data.

However, other data of the query 205 is sensitive, such as field names (e.g., "ENAME"), table names (e.g., "EMP"), particular data values (e.g., "324789"), the combination of data values and field names in the form of a predicate (e.g., "EMPNO=324789"), etc., which can directly or indirectly provide information describing the structure or format of the database if compromised.

In some embodiments, the query 205 is parsed 210 to identify a set of references 217 within the query 205 (shown in bold) that are sensitive—here, field names, table names, table aliases (e.g., "E"), predicate values (e.g., "324789"), etc. This process can utilize one or more grammars that encapsulate the different types of queries, thus enabling these references to be detected in an automated manner known to those of skill in the art.

Figure 3:
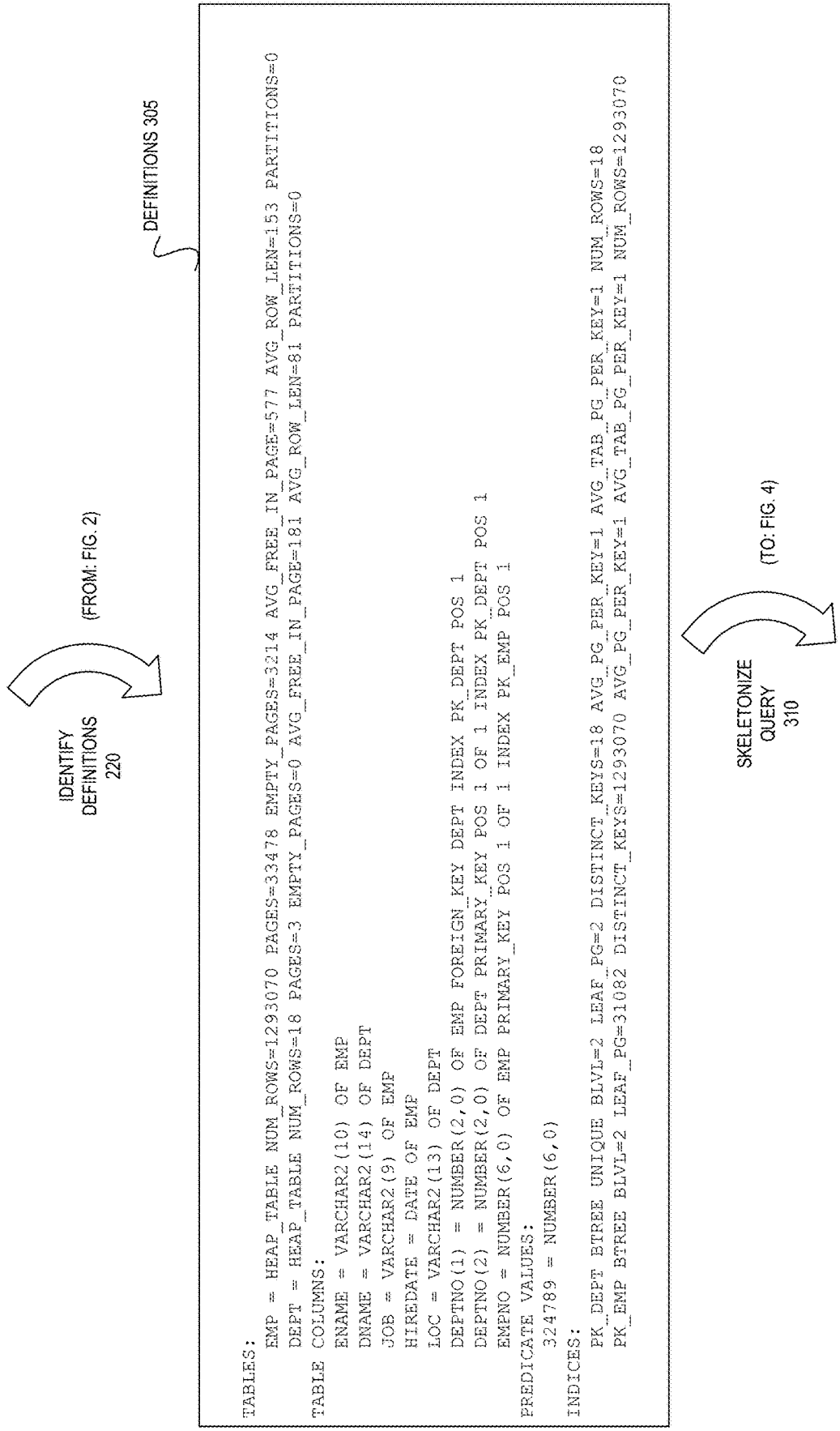
FIG. 3 is an example of reference definitions according to some embodiments.

The process continues with identifying 220 a set of definitions. FIG. 3 is an example of definitions 305 according to some embodiments. The definitions 305 describe attributes of the query and/or database that pertain to the query itself.

For example, the definitions 305 include two definitions for two tables referenced by the query—"EMP" and "DEPT." For example, with regard to the "EMP" table, the definition indicates what type of table is used to implement the table (here, a heap table), a number of rows of data in the table (here, over a million), a number of logical "pages" of memory/storage (e.g., of 4 KB, 8 KB, 16 KB, 32 KB, 64 KB, etc., in size) used to store the data (here, over thirty-thousand), a number of these pages that are completely empty (here, over three thousand), an average number of free entries within a non-empty page (here, over five hundred), an average length of a database row (here, over one-hundred and fifty), a number of partitions for the table (here, zero).

As another example, the definitions 305 include eight definitions for eight columns (also commonly referred to as attributes) involved in the query 205, including five from the SELECT clause, two from the ON clause, and one from the WHERE clause. Each definition indicates a type and size of the data stored in that column (e.g., VARCHAR2 of size 20, DATE, a NUMBER of precision 2 and scale 0. Those columns that serve as keys (e.g., the DEPTN columns serving as a primary key or foreign key, the EMPNO column serving as a primary key) also indicate what type of key they serve as, a type of index on the column and an identifier of the index, etc.

As another example, the definitions 305 include a definition for a predicate value that is within a predicate of the query that identifies an observed datatype of the value (here, a six-digit number of precision 6 and scale 0) or a determined datatype of the column associated with that value in the predicate (e.g., EMPNO, which again is a number of precision 6 and scale 0).

As yet another example, the definitions 305 include two definitions for the indices PK_DEPT and PD_EMP referenced in the table column definitions. For example, with regard to PK_DEPT, the definition includes what type of index is implemented (here, as a B-tree), whether the values of the column are unique, characteristics of the index (here, a level of 2), a number of distinct keys in the index, an average number of pages per key, etc.

In some embodiments, these definitions 305 can be obtained by sending a request to the database instance for data from the database instance catalog 124A. In some embodiments, the response(s) may include all possible definitions for the database, which may be stored in a cache 126A of the agent 120A, and this cache may be accessed for a particular query. However, in other embodiments, the agent 120A may obtain the definitions from the catalog 124A again for each query.

Figure 4:
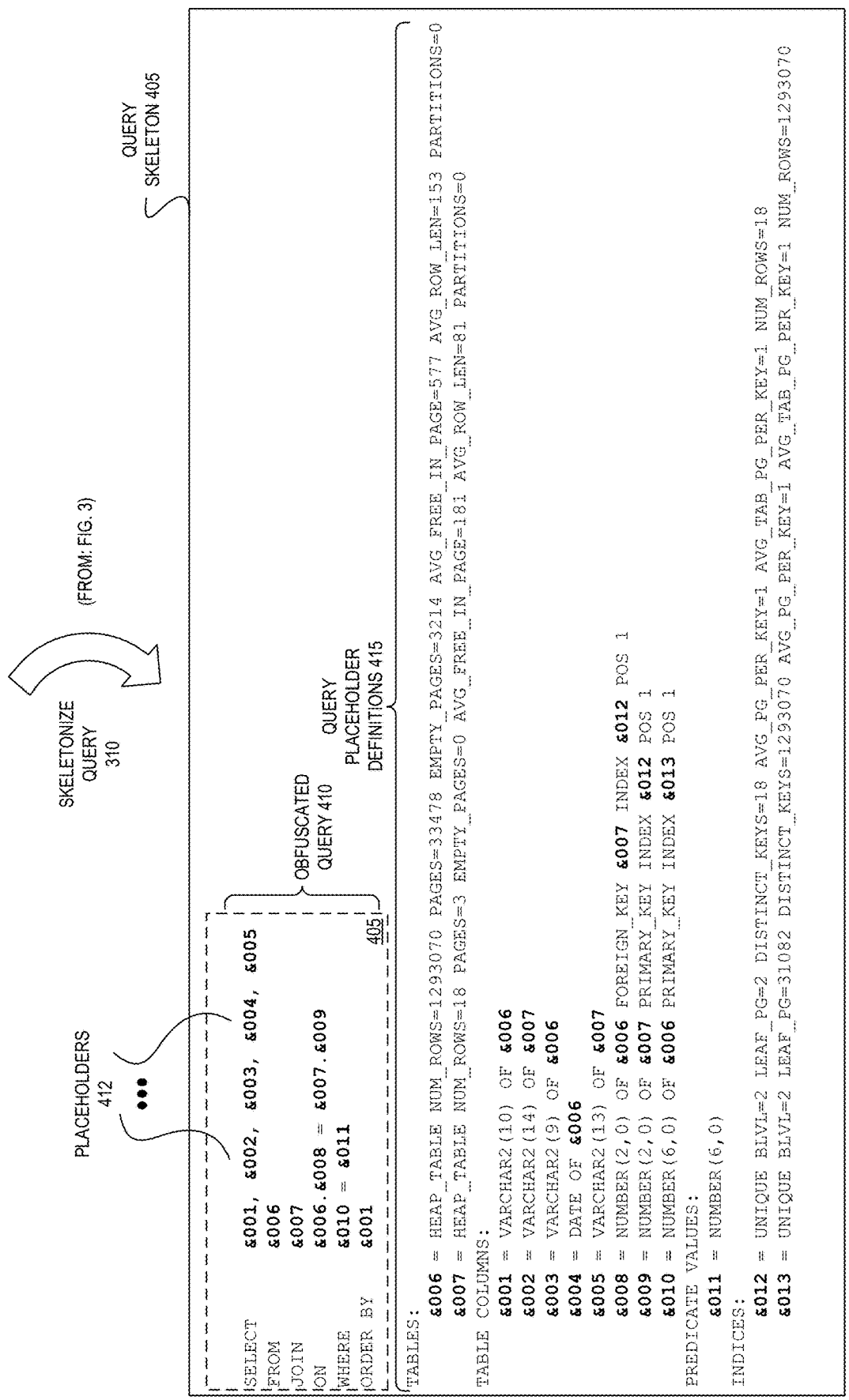
FIG. 4 is an example of a query skeleton including an obfuscated query and query placeholder definitions according to some embodiments.

With the identified definitions 305, the query may then be skeletonized 310 as shown in FIG. 4, which is an example of a query skeleton including an obfuscated query and query placeholder definitions according to some embodiments. To create a query skeleton 405, the identified "sensitive" references 217 can be replaced with placeholders 412 to form an obfuscated query 410, and these placeholders 412 may be defined in a set of query placeholder definitions 415 (e.g., from the definitions 305). The placeholders 412 may be implemented in a variety of ways known or derivable by those of skill in the art. For example, in this case each placeholder is designated with a unique value made up of an ampersand (&) and a three-digit integer, though of course other formats may be used. Notably, all sensitive information has been removed, though the query skeleton 405 provides sufficient information in terms of the format of the query (from the obfuscated query 410) as well as the description of the involved columns, indices, etc., of the query placeholder definitions 415 that allows for analysis techniques to have a deep understanding of what the query is attempting to accomplish and how it may be executed. With this format, the removal of the particular data values (table names, data values) does not result in any "loss" of information for analysis, though it beneficially does result in the loss of sensitive information.

Additionally or alternatively, embodiments disclosed herein can generate skeletons for execution plans 505 referred to as execution plan skeletons. For example, FIG. 5 is an example of an execution plan 505 and a partial execution plan skeleton 510 according to some embodiments. In some embodiments, an agent may directly obtain execution plans, or obtain queries and then send requests for execution plans (e.g., using queries known to those of skill in the art, such as via an "EXPLAIN" or "EXPLAIN PLAN" type query that provides the query), from the database instance. Similar to a database query, an execution plan also includes references (e.g., table names, etc.) that can be identified using known logic and replaced with placeholders with associated definitions as described above. Embodiments can thus create non-sensitive query plans that can be analyzed to detect how particular database engines are executing particular queries, without the need to reveal any sensitive information.

Figure 6:
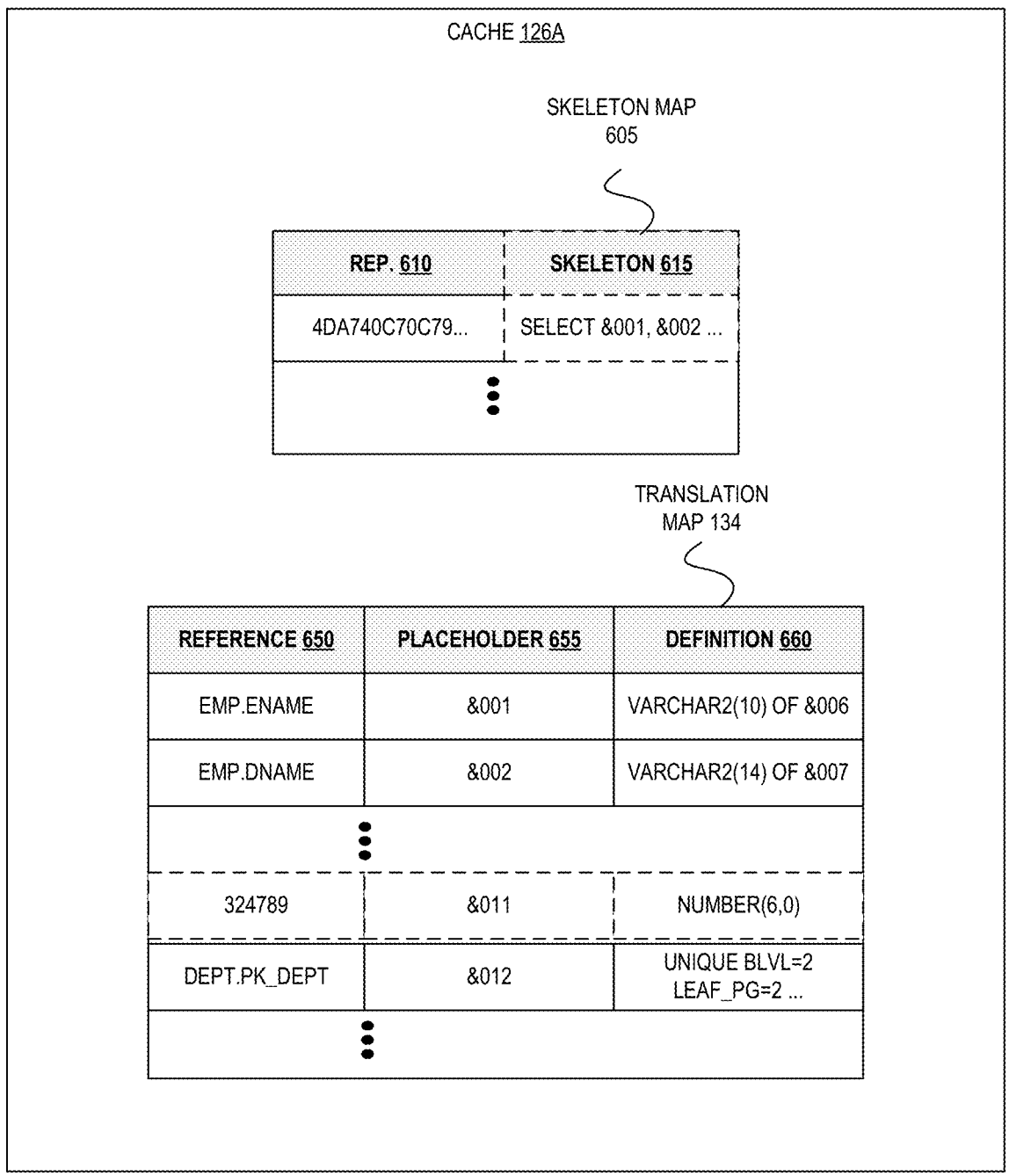
FIG. 6 is an example of a cache including a query skeleton map and a translation map according to some embodiments.

To generate skeletons, as indicated above, the agents may utilize a local cache 126A. FIG. 6 is an example of a cache including a query skeleton map 605 and a translation map 134 according to some embodiments.

In many environments a particular query may be executed multiple times, and potentially, a huge number of times over the span of minutes, hours, days, months, or even years. To avoid repeated processing by repeatedly generating a same skeleton, embodiments may determine whether a query has previously been skeletonized. For example, an agent may create a representation 610 of the query according to an algorithm (e.g., a hash algorithm, an encryption algorithm, etc.) to obtain a value that is extremely likely to uniquely identify a query. For example, a SHA hash may be computed using the query or a portion of the query to generate a query representation 610 that is a hash value. Thus, when a skeleton is created for a query or execution plan, a representation 610 may be created and stored in the skeleton map 605. In some embodiments, the representation 610 is stored along with the corresponding skeleton 615 itself or an identifier of where/how to access the skeleton 615 (e.g., from another storage location).

Additionally or alternatively, some embodiments may use a translation map 134, which includes a number of references 650 mapped to corresponding placeholder 655 values. A definition 660 for each placeholder 655 may also be stored in the translation map 134, or alternatively an identifier of where/how to access the definition 660 (e.g., from another storage location). In some embodiments, the translation map 134 may be created at one point in time (e.g., after launching of the agent 120A), such as by obtaining data from (e.g., the catalog 124A) of tables and their elements and detecting possible elements therefrom, creating placeholders for these elements, obtaining/creating definitions for these elements, etc., and storing this information in the translation map 134. However, this information may also be created and/or updated "on the fly" for elements referenced by particular queries/execution plans. Thus, this translation map 134 may be used during skeletonization to identify particular placeholders to be used and/or definitions to be used in the skeletons.

Turning back to FIG. 1, the generated skeletons 132 may be sent by the agents 120 at circle (4) to a storage system 130 of the database service 110 to be stored along with other skeletons 132.

In some embodiments, one or more of the agents 120 may send a translation map 134 to the storage system 130, allowing for the skeletons 132 that these agents send (at circle (4)) to be reduced, e.g., to include the obfuscated query 410 but not the query placeholder definitions 415, as the query placeholder definitions 415 can be re-generated using the obfuscated query 410 itself together with the translation map 134. Beneficially, this can result in the skeletons 132 being sent by the agents (and possibly cached in those agents' caches 126) being of significantly reduced size.

At circle (5), a database analysis engine 138 of the database service 110 may access the skeletons 132 (and optionally the translation map 134) to analyze ones of the skeletons 132, e.g., to identify query optimizations, execution plan optimizations, database layout optimizations, database configuration optimizations, etc., that can be suggested to users 102 via a message sent at optional circle (6A) and/or directly implemented via commands sent at circle (6B).

For example, the database analysis engine 138 may analyze a skeleton to determine whether any of a set of inefficiencies exist. One potential inefficiency to be looked for is a query requiring a full table scan to be performed on a relatively large table (of a particular threshold size) where the table is particularly sparse (e.g., having a threshold number of empty pages or records), where the database analysis engine 138 may suggest the addition of an index for a particular column to improve the execution of the query. Thus, the database analysis engine 138 may recommend the addition of the index to the user 102 (where the user 102 thereafter may issue a command to add one) or automatically add the index itself, assuming the user 102 has explicitly or implicitly opted-in to allowing such automatic updates.

Another potential inefficiency to be looked for is queries with inefficient "joins" or subqueries and recommending possible improvements these queries by, for example, replacing a type of subquery with a LEFT OUTER join, replacing OUTER JOINS with INNER JOINS, adding an index, etc. Another potential inefficiency to be looked for may include a column being configured to store 128 bytes of data while all queries over time only reference values with far fewer amounts of data (e.g., 2 bytes), and thus the database analysis engine 138 may suggest changing the data type/size of the column. Similarly, the database analysis engine 138 may analyze execution plan skeletons (or provide these skeletons to human administrators/engineers) to identify deficiencies in how the query planner/optimizer 122A decided to execute a query and may issue commands to change how the planner/optimizer 122A will craft execution plans to improve performance for future queries.

Accordingly, the database analysis engine 138 may be configured to search for a wide variety of types of inefficiencies known to those of skill in the art and suggest and/or apply improvements to address those inefficiencies, such as via adding or modifying indices, changing the structure of tables, modifying runtime/configuration parameters of database instances, modifying the particular query, changing query plan/optimization logic, etc.

Figure 7:
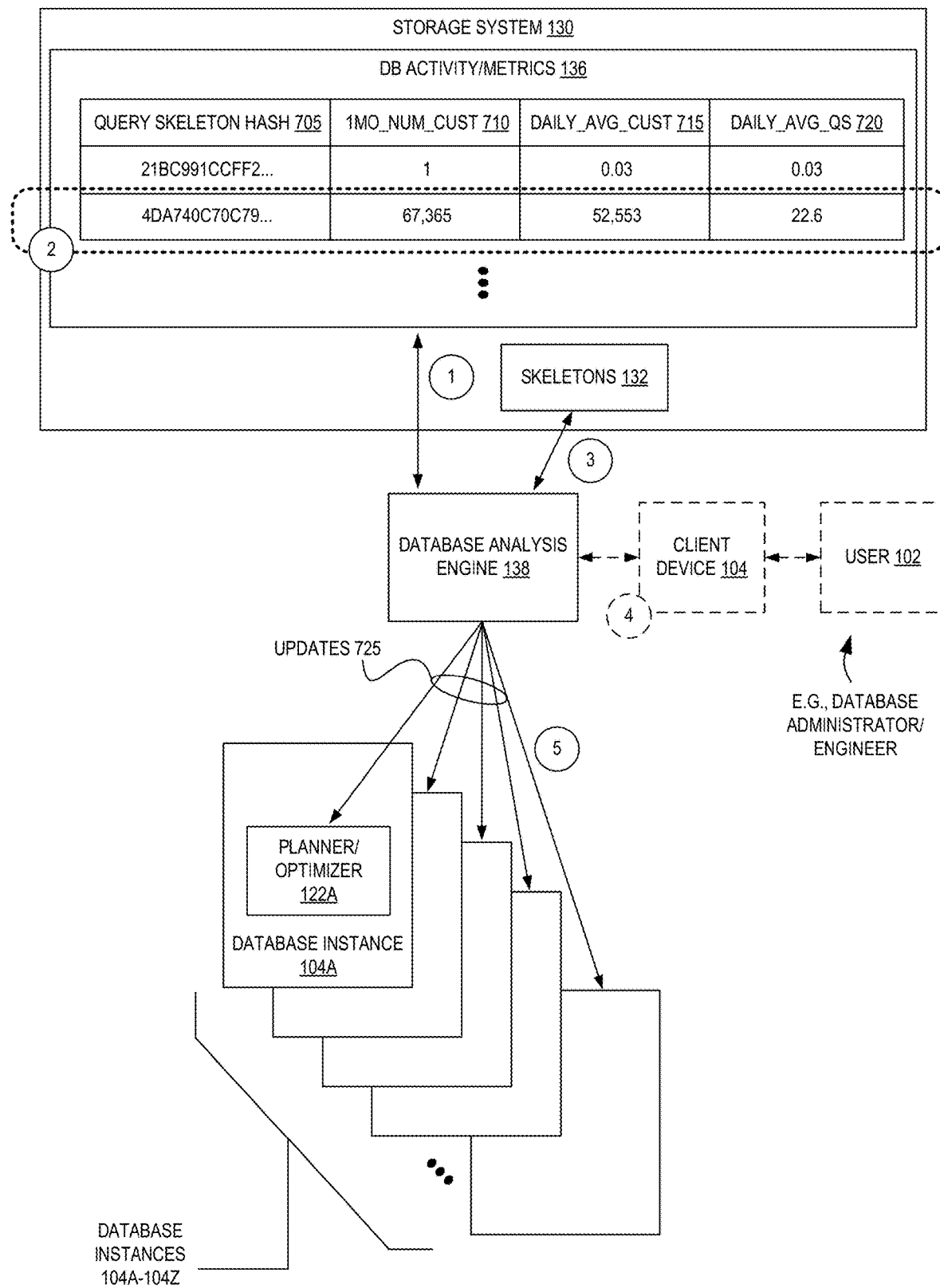
FIG. 7 is a diagram illustrating an environment for dynamic database improvement via updates identified via skeleton-based analysis according to some embodiments.

The database analysis engine 138 also, in some embodiments, can identify and then analyze queries run by multiple users across multiple database instances that are the same, are extremely similar, or have common characteristics. For example, FIG. 7 is a diagram illustrating an environment for dynamic database improvement via updates identified via skeleton-based analysis according to some embodiments. In this example, a set of database activity/metrics data is maintained, including a table with metrics for each query—here, a query skeleton hash 705 is associated with an indicator 710 of how many different customers have executed that query over the previous one month, an indicator 715 of an average number of customers that have run that query per day over the previous month, an indicator 720 of an average number of times the query was run per day over the last month, etc. Thus, the database analysis engine 138 may search for "common" or largely-executed queries (e.g., by finding records having an indicator or indicators that meet or exceed some threshold(s), by finding records having a comparatively large indicator value, etc.). For such "common" queries, the database analysis engine 138 (or a user 102 such as a database administrator or engineer) may aggressively search for improvements and suggest these to the associated users and/or implement changes via updates 725 (e.g., to planner/optimizer 122 code) to make the improvements. Notably, even small changes to queries run by a large number of users—e.g., queries made by popular software packages—that result in small per-query execution improvements may provide a very large benefit across the database service 110 due to the large number of queries benefitting from the change. For example, a change for a query to improve its execution by 10% may create an extremely large benefit system-wide if hundreds or thousands (or more) of users are regularly running this query.

In some embodiments, the database analysis engine 138 (or another component/service of the provider network) may utilize machine learning (ML) techniques to identify suggested changes based on skeletons 132 and database activity/metric 136 data. For example, ML models 140 (or other logic) may be utilized to identify a set of changes that were actually made by users (e.g., database configuration changes) and identify the change in performance of common queries executed before the change(s) compared to those queries executed after the change(s). Thus, via use of skeletons 132, the database analysis engine 138 can observe the actual execution character tics of actual queries over time, and identify changes made that positively or negatively impacted the execution of these queries.

Figure 8:
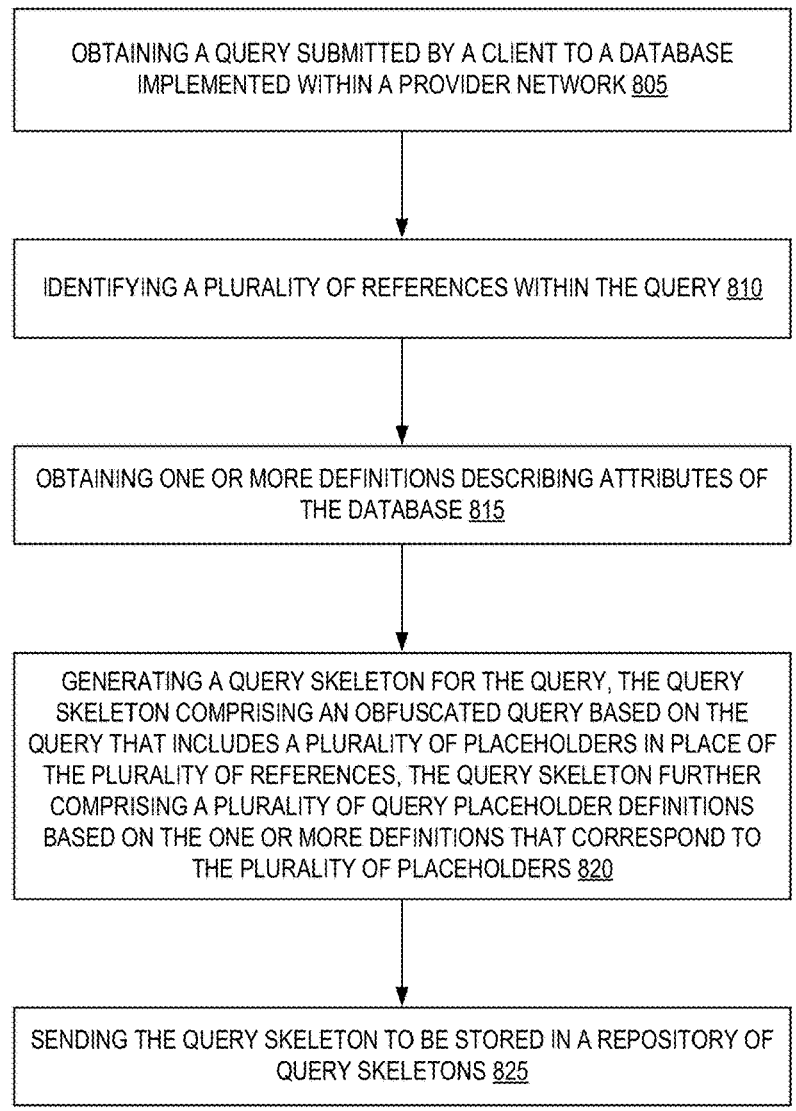
FIG. 8 is a flow diagram illustrating operations of a method for database query information protection using skeletons according to some embodiments.

FIG. 8 is a flow diagram illustrating operations 800 of a method for database query information protection using skeletons according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by the agent 120A (or database service 110) of the other figures.

The operations 800 include, at block 805, obtaining a query submitted by a client to a database implemented within a provider network. In some embodiments, the query includes personally identifying information (PII). The query may be a SQL query adherent to a particular SQL standard. The query may be a SELECT query, an UPDATE query, a DELETE query, etc. The query may include one or more predicates, where each predicate indicates a condition that can be evaluated to true or false, and may include a predicate value (e.g., a number, a string, etc.) that is to be compared or evaluated with regard to a corresponding value (e.g., from the database). The obtaining may include sending a request to the database (e.g., periodically, such as every 1 second, 5 seconds, etc.) for a number of currently executing queries and receiving a response including identifiers of the queries and/or the queries themselves.

The operations 800 include, at block 810, identifying a plurality of references within the query. In some embodiments, each of the plurality of references comprises one of a table name, a field name, or a predicate value. In some embodiments, the plurality of references includes at least one table name, at least one field name, and at least one predicate value. The identifying may include parsing the query according to a grammar to break the query into its constituent portions, e.g., by identifying reserved keywords, etc.

At block 815, the operations 800 include obtaining one or more definitions describing attributes of the database. In some embodiments, block 815 includes sending a request to the database (e.g., for catalog information) and receiving a response including the one or more definitions. The definitions may specify tables of the database, characteristics of data stored in the tables, fields (also referred to as columns) of the tables, types/sizes of the fields, indexes, characteristics of the indexes, etc.

In some embodiments, the operations 800 optionally include generating an identifier (e.g., a hash value such as a SHA hash) for the query based on the query; and determining, based on performing a lookup in a data structure using the identifier, that the query skeleton for the query has not already been generated (e.g., based on no record/entry existing in the data structure that matches the hash value). For example, generating the identifier may include computing a hash of the query itself, computing a hash of a portion of the query or a modified version of the query (e.g., having certain literal values such as integers or strings removed or replaced), etc.

The operations 800 include, at block 820, generating a query skeleton for the query. The query skeleton comprises an obfuscated query based on the query that includes a plurality of placeholders in place of the plurality of references, the query skeleton further comprising a plurality of query placeholder definitions based on the one or more definitions that correspond to the plurality of placeholders. In some embodiments, the query skeleton does not include any PII. The generating of the query skeleton may include replacing the plurality of references within the query with corresponding ones of the plurality of placeholders, resulting in the obfuscated query, which may be combined or associated with the plurality of placeholder definitions to yield the query skeleton.

In some embodiments, the plurality of query placeholder definitions includes: at least one table definition; at least one field definition; and at least one predicate value definition. In some embodiments, the plurality of query placeholder definitions further includes at least one index definition.

At block 825, the operations 800 include sending the query skeleton to be stored in a repository of query skeletons (e.g., at a storage location of a storage system, which may be within the provider network). The skeleton may be sent in a message to an endpoint associated with a storage service of a provider network.

According to some embodiments, the operations 800 further include accessing the query skeleton from the repository of query skeletons; generating, based on the obfuscated query and the plurality of query placeholder definitions of the query skeleton, a recommended modification to the query or to a configuration of the database; and sending a message identifying the recommended modification to a client device of a user of the provider network. In some embodiments, these operations may be performed by the database analysis engine 138 of FIG. 1. In some embodiments, the operations 800 further include modifying a query optimizer of the database so that it generates a different query plan for the query determined to improve processing of the query.

Figure 9:
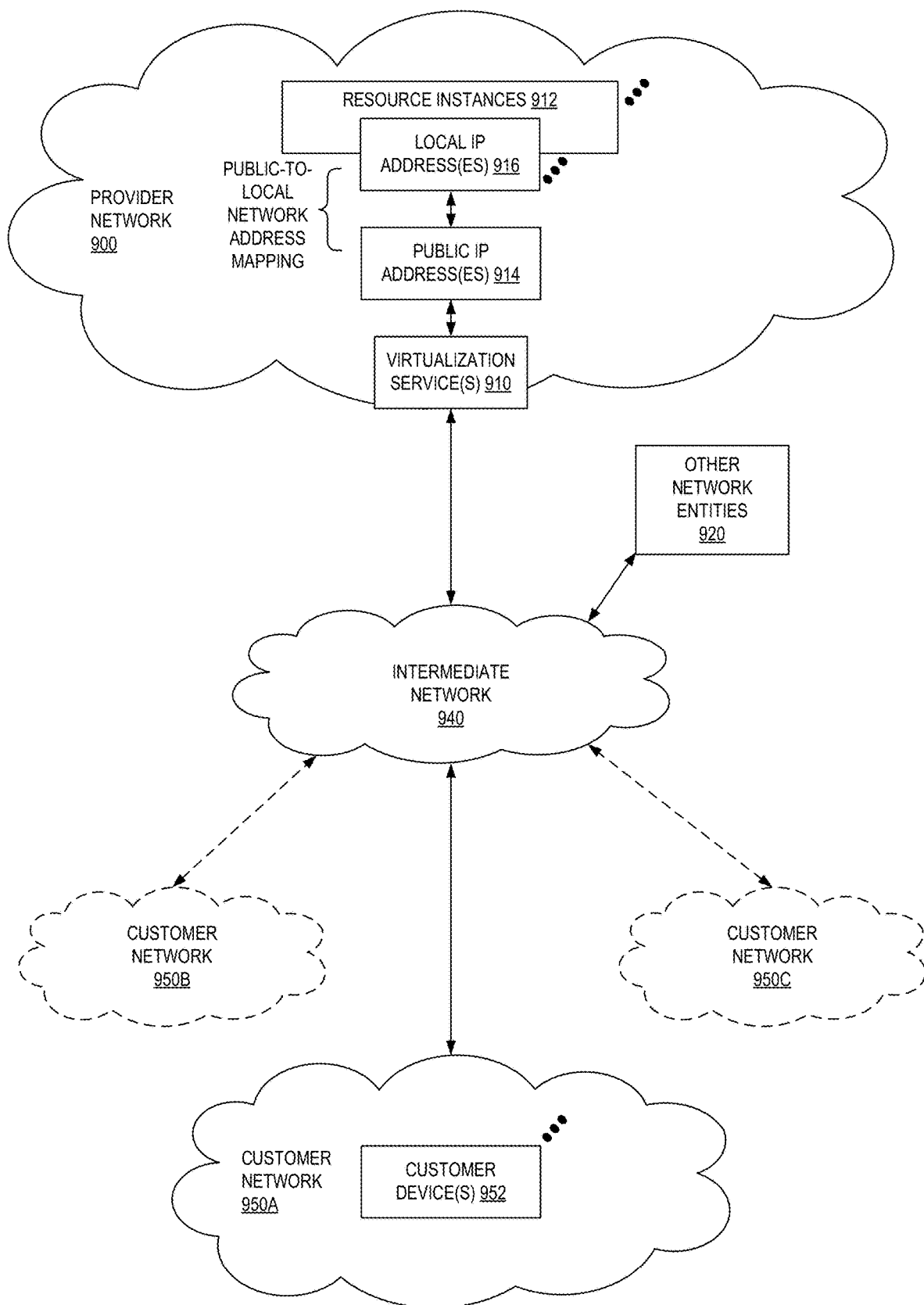
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
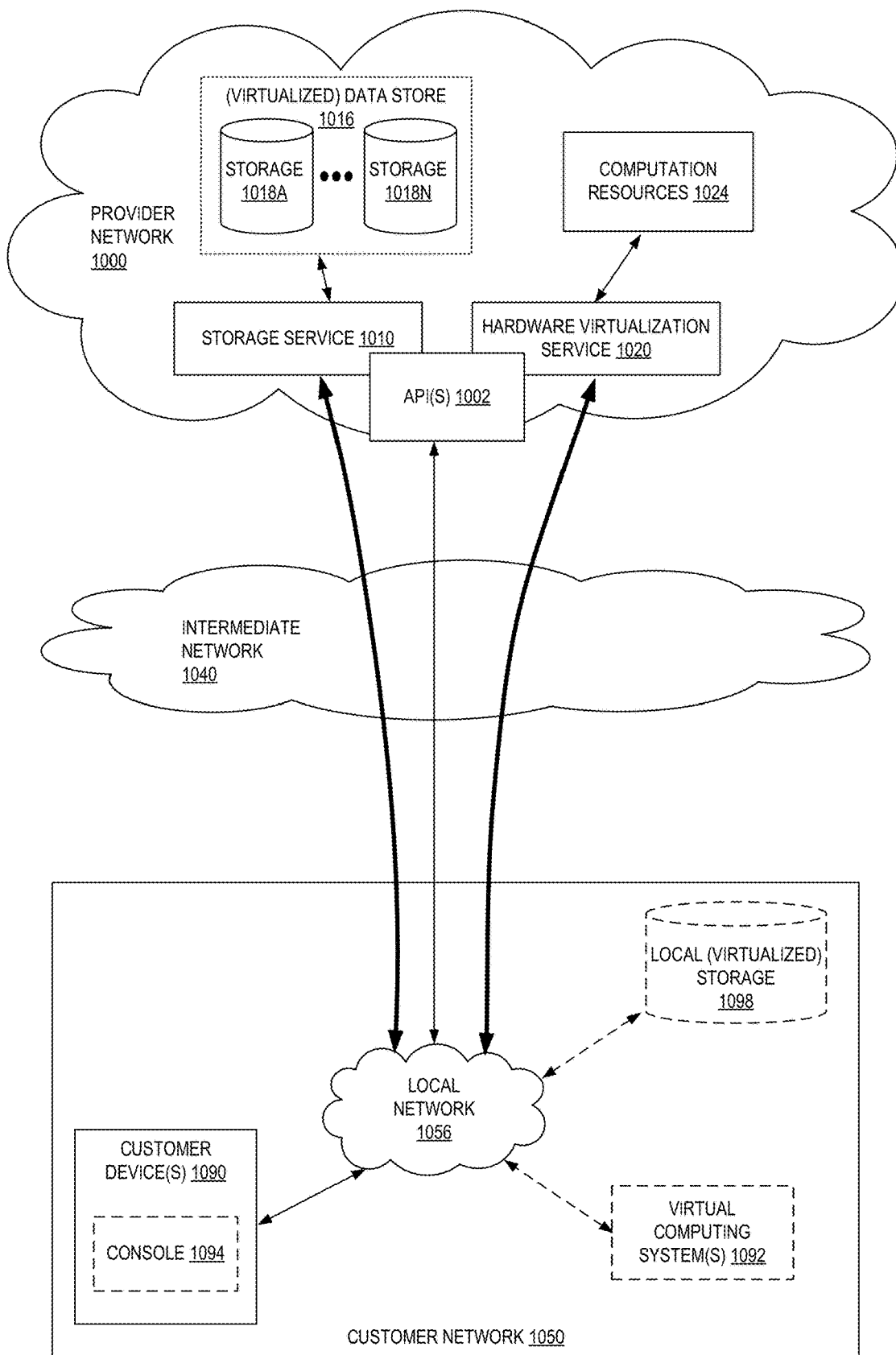
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative System

Figure 11:
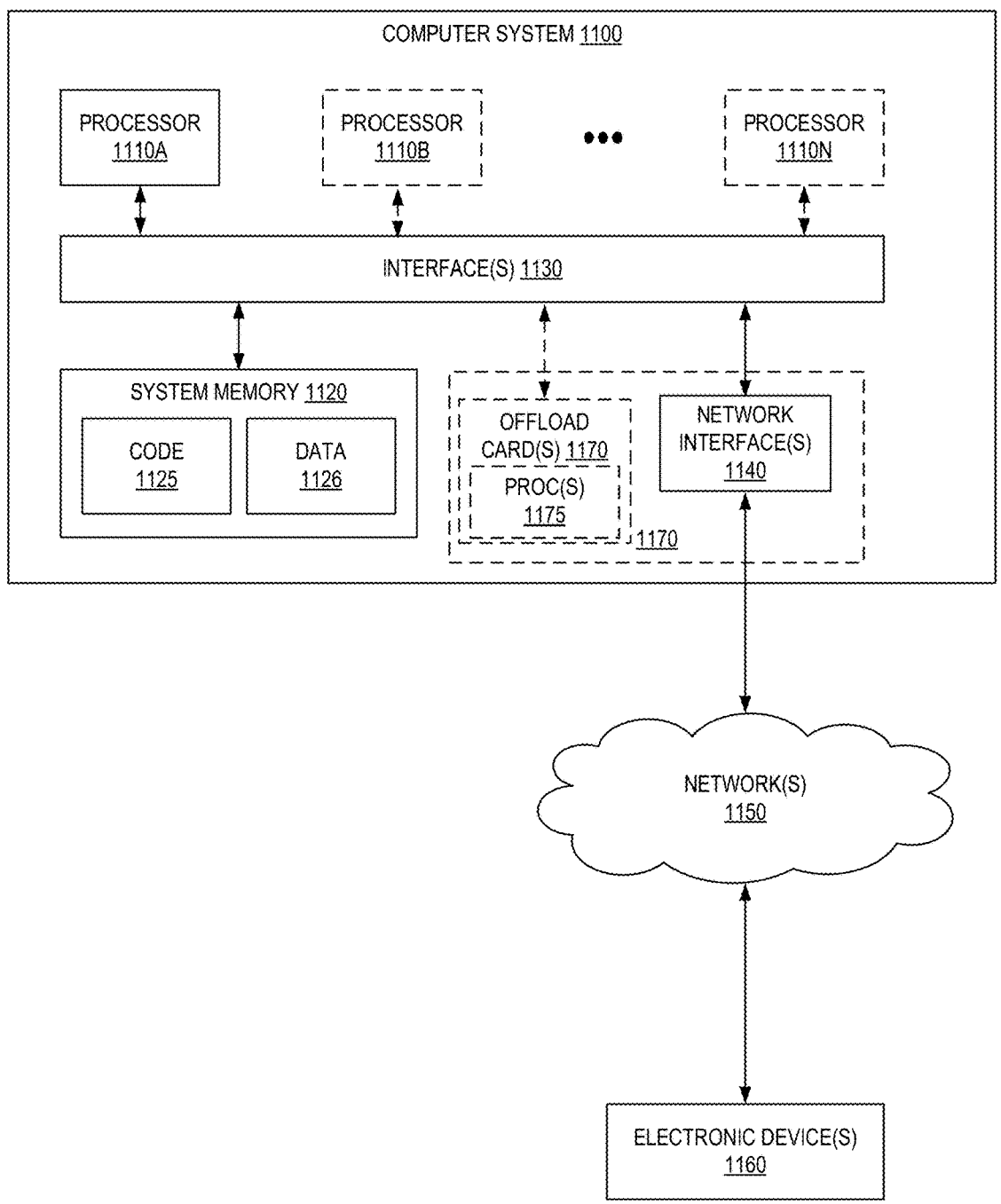
FIG. 11 is a block diagram illustrating an example computer system that may be used in some embodiments.

In some embodiments, a system that implements a portion or all of the techniques for database query information protection using skeletons as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   obtaining, by an agent executed at a computing device within a provider network that also executes a database instance, a query submitted by a client to the database instance;
   identifying a plurality of references within the query, wherein the plurality of references includes at least one table name, at least one field name, and at least one predicate value;
   obtaining, by the agent based on data received from the database instance, one or more definitions that describe attributes of at least one structure of the database corresponding to at least one of the plurality of references;
   generating a query skeleton for the query, the query skeleton comprising an obfuscated query based on the query that includes a plurality of placeholders in place of the plurality of references, the query skeleton further comprising a plurality of query placeholder definitions based on the one or more definitions that correspond to the plurality of placeholders;
   sending the query skeleton to be stored in a repository of query skeletons; and
   analyzing one or more query skeletons of the repository of query skeletons to identify a modification to the query or to the database instance that would result in improved performance in processing the query,
   wherein obtaining the query, identifying the plurality of references, obtaining the one or more definitions, generating the query skeleton, and sending the query skeleton are all performed by an agent executed by the computing device within the provider network that also executes at least the database instance, and
   wherein the repository of query skeletons is implemented by a different one or more computing devices.

2. The computer-implemented method of claim 1, further comprising:
   sending a message to a client device of a user associated with the database instance, the message identifying the modification.

3. The computer-implemented method of claim 1, wherein the modification is for the database instance, and wherein the method further comprises:
   updating the database instance to implement the modification.

4. A computer-implemented method comprising:
   obtaining a query submitted by a client to a database implemented within a provider network;
   identifying a plurality of references within the query;
   obtaining one or more definitions describing attributes of the database;
   generating a query skeleton for the query, the query skeleton comprising an obfuscated query based on the query that includes a plurality of placeholders in place of the plurality of references, the query skeleton further comprising a plurality of query placeholder definitions based on the one or more definitions that correspond to the plurality of placeholders; and
   sending the query skeleton to be stored in a repository of query skeletons,
   wherein obtaining the query, identifying the plurality of references, obtaining the one or more definitions, generating the query skeleton, and sending the query skeleton are all performed by an agent executed by a same computing device within the provider network that also executes at least a portion of the database, and
   wherein the repository of query skeletons is implemented by a different one or more computing devices.

5. The computer-implemented method of claim 4, wherein at least one of the plurality of references comprises one of a table name, a field name, or a predicate value.

6. The computer-implemented method of claim 5, wherein the plurality of references includes at least one table name, at least one field name, and at least one predicate value.

7. The computer-implemented method of claim 6, wherein the plurality of query placeholder definitions includes:
   at least one table definition;
   at least one field definition; and
   at least one predicate value definition.

8. The computer-implemented method of claim 7, wherein the plurality of query placeholder definitions further includes at least one index definition.

9. The computer-implemented method of claim 4, wherein obtaining the one or more definitions comprises sending a request to the database and receiving a response including the one or more definitions.

10. The computer-implemented method of claim 4, further comprising:
    generating an identifier for the query based on the query; and
    determining, based on performing a lookup in a data structure using the identifier, that the query skeleton for the query has not already been generated.

11. The computer-implemented method of claim 4, further comprising:
    accessing the query skeleton from the repository of query skeletons;
    generating, based on the obfuscated query and the plurality of query placeholder definitions of the query skeleton, a recommended modification to the query or to a configuration of the database; and
    sending a message identifying the recommended modification to a client device of a user of the provider network.

12. The computer-implemented method of claim 4, further comprising:
    modifying a query optimizer of the database so that it generates a different query plan for the query determined to improve processing of the query.

13. The computer-implemented method of claim 4, wherein the query includes personally identifying information (PII) and the query skeleton does not include the PII.

14. A system comprising:
    a database instance and an agent implemented by a same computing device within a provider network; and
    a storage system implemented by a different one or more computing devices within the provider network that implements a repository of query skeletons,
    the agent including instructions that upon execution cause the agent to:
        obtain a query submitted by a client to the database instance;
        identify a plurality of references within the query;
        obtain one or more definitions describing attributes of the database;
        generate a query skeleton for the query, the query skeleton comprising an obfuscated query based on the query that includes a plurality of placeholders in place of the plurality of references, the query skeleton further comprising a plurality of query placeholder definitions based on the one or more definitions that correspond to the plurality of placeholders; and
        send the query skeleton to the storage system to be stored in the repository of query skeletons.

15. The system of claim 14, wherein each of the plurality of references comprises one of a table name, a field name, or a predicate value.

16. The system of claim 15, wherein the plurality of references includes at least one table name, at least one field name, and at least one predicate value.

17. The system of claim 16, wherein the plurality of query placeholder definitions includes:
    at least one table definition;
    at least one field definition; and
    at least one predicate value definition.

18. The system of claim 17, wherein the plurality of query placeholder definitions further includes at least one index definition.

19. The system of claim 14, wherein the instructions upon execution further cause the agent to:
    generate an identifier for the query based on the query; and
    determine, based on performing a lookup in a data structure using the identifier, that the query skeleton for the query has not already been generated.

20. The system of claim 14, wherein the query includes personally identifying information (PII) and the query skeleton does not include the PII.

* * * * *